(12) United States Patent
Nathan

(10) Patent No.: US 7,293,277 B1
(45) Date of Patent: Nov. 6, 2007

(54) REMOTE CONTROL UNIT FOR INTELLIGENT DIGITAL AUDIOVISUAL REPRODUCTION SYSTEMS

(75) Inventor: Guy Nathan, Yerres (FR)

(73) Assignee: Touchtunes Music Corporation, Las Vegas, NV (US)

( * ) Notice: Subject to any disclaimer, the term of this patent is extended or adjusted under 35 U.S.C. 154(b) by 0 days.

(21) Appl. No.: 09/357,764

(22) Filed: Jul. 21, 1999

(30) Foreign Application Priority Data

Jul. 22, 1998 (FR) .................................. 98 09351

(51) Int. Cl.
| | |
|---|---|
| H04N 7/16 | (2006.01) |
| H04N 7/18 | (2006.01) |
| H04N 7/173 | (2006.01) |
| H04N 5/44 | (2006.01) |
| G06F 15/16 | (2006.01) |
| G06F 15/177 | (2006.01) |

(52) U.S. Cl. ............................ 725/78; 725/80; 725/86; 725/87; 725/131; 725/139; 725/151; 709/219; 709/221; 348/734

(58) Field of Classification Search ........ 348/731–734, 348/552; 725/37–38, 110, 131, 133, 139, 725/141, 146, 151, 153, 78, 80, 82, 91, 86, 725/87, 132
See application file for complete search history.

(56) References Cited

U.S. PATENT DOCUMENTS

| | | |
|---|---|---|
| 3,982,620 A | 9/1976 | Kotenhaus |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,356,509 A * | 10/1982 | Skerlos et al. ................ 358/85 |
| 4,412,292 A | 10/1983 | Sedam |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,582,324 A | 4/1986 | Koza |
| 4,593,904 A | 6/1986 | Graves |
| 4,597,058 A | 6/1986 | Izumi |
| 4,636,951 A | 1/1987 | Harlick |
| 4,652,998 A * | 3/1987 | Koza et al. ................ 364/412 |
| 4,654,799 A | 3/1987 | Ogaki |
| 4,658,093 A | 4/1987 | Hellman |
| 4,667,802 A | 5/1987 | Verduin |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |

(Continued)

FOREIGN PATENT DOCUMENTS

| | | |
|---|---|---|
| DE | 3723737 A1 | 1/1988 |
| DE | 3820835 A1 | 1/1989 |
| DE | A 3820835 | 1/1989 |
| DE | 4244198 | 6/1994 |
| EP | 0786122 B1 | 7/1997 |

(Continued)

Primary Examiner—Scott E. Beliveau
Assistant Examiner—Son P Huynh
(74) Attorney, Agent, or Firm—Nixon & Vanderhye P.C.

(57) ABSTRACT

The invention relates to a remote control unit for intelligent digital audiovisual reproduction systems, comprising storage means, payment means, a sound control circuit, display means and a metal chassis wherein said remote control unit comprises a distant radio frequency transmitter that is associated with a radio frequency receiver connected to the sound control circuit of the audiovisual reproduction system.

5 Claims, 1 Drawing Sheet

U.S. PATENT DOCUMENTS

Figure 1:
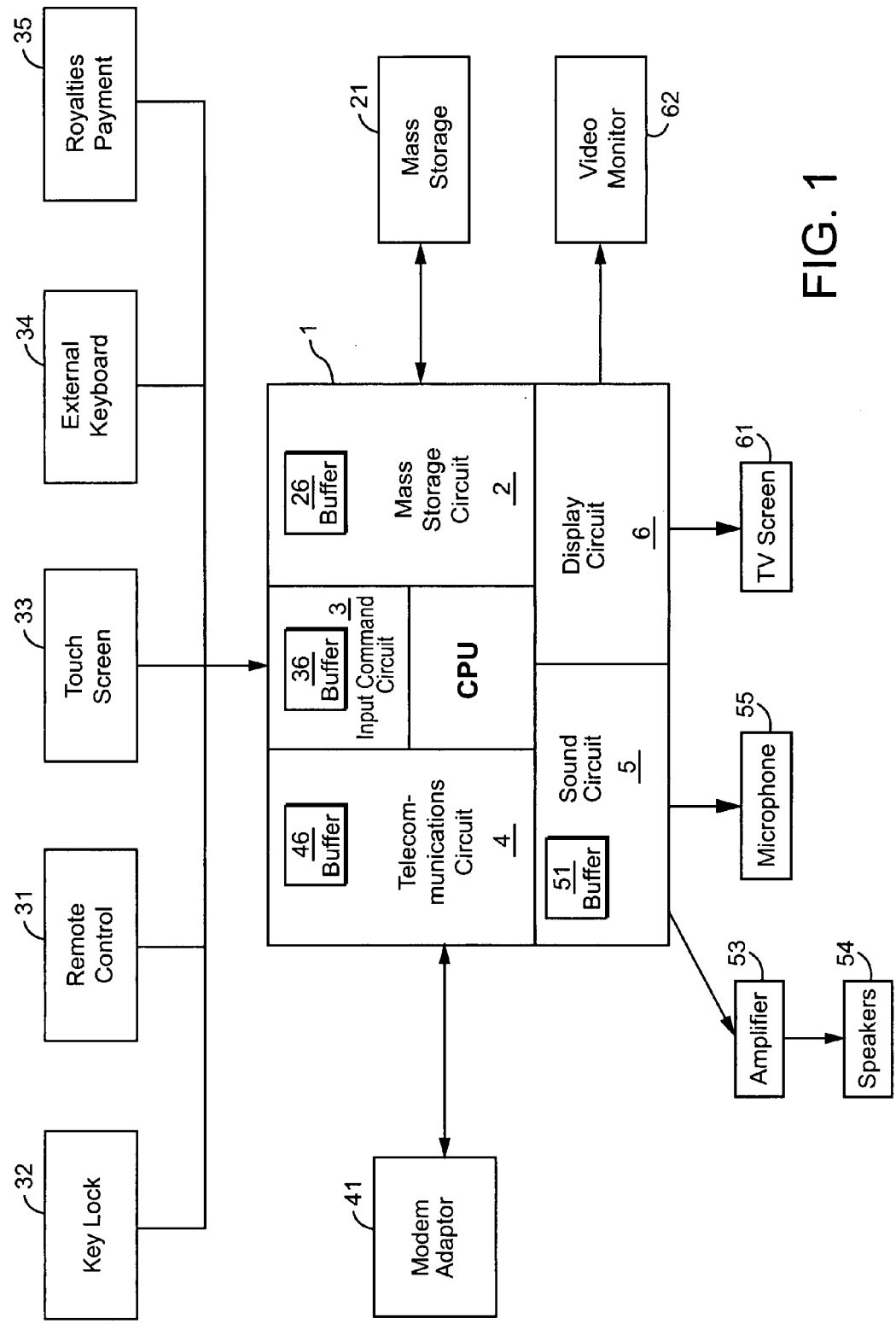

| | | | |
|---|---|---|---|
| 4,707,804 A | 11/1987 | Leal | |
| 4,722,053 A | 1/1988 | Dubno | |
| 4,761,684 A | 8/1988 | Clark | |
| 4,766,581 A | 8/1988 | Korn | |
| 4,787,050 A | 11/1988 | Suzuki | |
| 4,792,849 A | 12/1988 | McCalley | |
| 4,807,052 A * | 2/1989 | Amano | 358/194.1 |
| 4,811,325 A | 3/1989 | Sharples | |
| 4,825,054 A | 4/1989 | Rust | |
| 4,829,570 A | 5/1989 | Schotz | |
| 4,868,832 A | 9/1989 | Marrington | |
| 4,905,279 A * | 2/1990 | Nishio | 380/9 |
| 4,920,432 A | 4/1990 | Eggers | |
| 4,922,420 A | 5/1990 | Nakagawa | |
| 4,924,378 A | 5/1990 | Hershey | |
| 4,926,485 A | 5/1990 | Yamashita | |
| 4,937,807 A | 6/1990 | Weitz | |
| 4,949,187 A | 8/1990 | Cohen | |
| 4,956,768 A | 9/1990 | Sidi | |
| 4,958,835 A | 9/1990 | Tashiro | |
| 4,999,806 A | 3/1991 | Chernow | |
| 5,012,121 A | 4/1991 | Hammond | |
| 5,041,921 A | 8/1991 | Scheffler | |
| 5,046,093 A * | 9/1991 | Wachob | 380/241 |
| 5,058,089 A | 10/1991 | Yoshimara | |
| 5,077,607 A | 12/1991 | Johnson et al. | |
| 5,081,534 A * | 1/1992 | Geiger et al. | 348/734 |
| 5,101,499 A * | 3/1992 | Streck et al. | 455/4 |
| 5,138,712 A | 8/1992 | Corbin | |
| 5,148,159 A * | 9/1992 | Clark et al. | 340/825.22 |
| 5,155,847 A | 10/1992 | Kirouac | |
| 5,163,131 A | 11/1992 | Row | |
| 5,166,886 A | 11/1992 | Molnar | |
| 5,191,573 A | 3/1993 | Hair | |
| 5,191,611 A | 3/1993 | Lang | |
| 5,192,999 A | 3/1993 | Graczyk | |
| 5,197,094 A * | 3/1993 | Tillery et al. | 379/91 |
| 5,203,028 A | 4/1993 | Shiraishi | |
| 5,237,157 A | 8/1993 | Kaplan | |
| 5,237,322 A | 8/1993 | Heberle | |
| 5,239,480 A * | 8/1993 | Huegel | 705/5 |
| 5,250,747 A | 10/1993 | Tsumura | |
| 5,252,775 A | 10/1993 | Urano | |
| 5,260,999 A | 11/1993 | Wyman | |
| 5,262,875 A | 11/1993 | Mincer et al. | |
| 5,276,866 A | 1/1994 | Paolini | |
| 5,315,161 A | 5/1994 | Robinson | |
| 5,321,846 A * | 6/1994 | Yokota et al. | 455/4.2 |
| 5,339,413 A | 8/1994 | Koval | |
| 5,341,350 A | 8/1994 | Frank | |
| 5,355,302 A * | 10/1994 | Martin et al. | 364/410 |
| 5,357,276 A | 10/1994 | Banker | |
| 5,369,778 A | 11/1994 | SanSoucie | |
| 5,375,206 A | 12/1994 | Hunter | |
| 5,386,251 A * | 1/1995 | Movshovich | 348/734 |
| 5,410,326 A * | 4/1995 | Goldstein | 348/734 |
| 5,418,713 A | 5/1995 | Allen | |
| 5,420,923 A | 5/1995 | Beyers | |
| 5,428,252 A | 6/1995 | Walker | |
| 5,431,492 A | 7/1995 | Rothschild | |
| 5,444,499 A * | 8/1995 | Saitoh | 348/734 |
| 5,445,295 A | 8/1995 | Brown | |
| 5,455,926 A | 10/1995 | Keele | |
| 5,457,305 A | 10/1995 | Akel | |
| 5,465,213 A | 11/1995 | Ross | |
| 5,475,835 A | 12/1995 | Hickey | |
| 5,481,509 A | 1/1996 | Knowles | |
| 5,495,610 A | 2/1996 | Shing | |
| 5,496,178 A | 3/1996 | Back | |
| 5,499,921 A | 3/1996 | Sone | |
| 5,511,000 A | 4/1996 | Kaloi | |
| 5,513,117 A | 4/1996 | Small | |
| 5,515,173 A * | 5/1996 | Mankovitz et al. | 386/131 |
| 5,519,457 A * | 5/1996 | Nishigaki et al. | 348/734 |
| 5,548,729 A | 8/1996 | Akiyoshi | |
| 5,550,577 A | 8/1996 | Verbiest | |
| 5,555,244 A | 9/1996 | Gupta | |
| 5,557,541 A | 9/1996 | Schulhof | |
| 5,559,505 A | 9/1996 | McNair | |
| 5,559,549 A | 9/1996 | Hendricks | |
| 5,561,709 A | 10/1996 | Remillard | |
| 5,566,237 A | 10/1996 | Dobbs | |
| 5,570,363 A | 10/1996 | Holm | |
| 5,578,999 A * | 11/1996 | Matsuzawa et al. | 340/825.22 |
| 5,583,994 A | 12/1996 | Rangan | |
| 5,592,551 A | 1/1997 | Lett | |
| 5,594,509 A | 1/1997 | Florin | |
| 5,612,581 A | 3/1997 | Kageyama | |
| 5,613,909 A | 3/1997 | Stelovsky | |
| 5,616,876 A * | 4/1997 | Cluts | 84/609 |
| 5,619,247 A | 4/1997 | Russo | |
| 5,619,698 A | 4/1997 | Lillich | |
| 5,623,666 A | 4/1997 | Pike | |
| 5,642,337 A | 6/1997 | Oskay | |
| 5,644,714 A | 7/1997 | Kikinis | |
| 5,644,766 A | 7/1997 | Coy | |
| 5,654,714 A * | 8/1997 | Takahashi et al. | 341/176 |
| 5,663,756 A * | 9/1997 | Blahut et al. | 725/30 |
| 5,668,592 A | 9/1997 | Spaulding | |
| 5,668,788 A | 9/1997 | Allison | |
| 5,684,716 A | 11/1997 | Freeman | |
| 5,691,778 A | 11/1997 | Song | |
| 5,691,964 A * | 11/1997 | Niederlein et al. | 369/30 |
| 5,697,844 A | 12/1997 | Von Kohorn | |
| 5,703,795 A | 12/1997 | Mankowitz | |
| 5,708,811 A | 1/1998 | Arendt | |
| 5,712,976 A | 1/1998 | Falcon | |
| 5,721,583 A * | 2/1998 | Harada et al. | 725/24 |
| 5,726,909 A | 3/1998 | Krikorian | |
| 5,734,719 A | 3/1998 | Tsevdos | |
| 5,734,961 A | 3/1998 | Castille | |
| 5,748,254 A * | 5/1998 | Harrison et al. | 348/552 |
| 5,761,655 A | 6/1998 | Hoffman | |
| 5,762,552 A | 6/1998 | Vuong | |
| 5,774,668 A | 6/1998 | Choqiuer | |
| 5,774,672 A | 6/1998 | Funahashi | |
| 5,781,889 A | 7/1998 | Martin | |
| 5,786,784 A * | 7/1998 | Gaudichon | 341/176 |
| 5,790,172 A | 8/1998 | Imanaka | |
| 5,790,671 A | 8/1998 | Cooper | |
| 5,790,856 A | 8/1998 | Lillich | |
| 5,793,980 A | 8/1998 | Glaser | |
| 5,798,785 A | 8/1998 | Hendricks | |
| 5,802,599 A | 9/1998 | Cabrera | |
| 5,808,224 A | 9/1998 | Kato | |
| 5,809,246 A | 9/1998 | Goldman | |
| 5,831,555 A * | 11/1998 | Yu et al. | 341/26 |
| 5,831,663 A * | 11/1998 | Waterhouse et al. | 348/8 |
| 5,832,287 A | 11/1998 | Atalla | |
| 5,835,843 A | 11/1998 | Haddad | |
| 5,845,104 A | 12/1998 | Rao | |
| 5,848,398 A | 12/1998 | Martin | |
| 5,851,149 A * | 12/1998 | Xidos et al. | 463/42 |
| 5,854,887 A | 12/1998 | Kindell | |
| 5,862,324 A | 1/1999 | Collins | |
| 5,864,870 A | 1/1999 | Guck | |
| 5,867,714 A | 2/1999 | Todd | |
| 5,884,028 A | 3/1999 | Kindell | |
| 5,884,298 A | 3/1999 | Smith | |
| 5,887,193 A | 3/1999 | Takahashi | |
| 5,896,094 A * | 4/1999 | Narisada et al. | 340/825.31 |
| 5,913,040 A | 6/1999 | Rakavy | |
| 5,915,094 A | 6/1999 | Kouloheris | |
| 5,915,238 A | 6/1999 | Tjaden | |

| | | | |
|---|---|---|---|
| 5,917,537 A | 6/1999 | Lightfoot | |
| 5,917,835 A | 6/1999 | Barrett | |
| 5,923,885 A | 7/1999 | Johnson | |
| 5,926,531 A * | 7/1999 | Petite | 379/144 |
| 5,930,765 A | 7/1999 | Martin | |
| 5,931,908 A | 8/1999 | Gerba | |
| 5,933,090 A * | 8/1999 | Christenson | 340/825.69 |
| 5,949,688 A | 9/1999 | Montoya | |
| 5,959,869 A | 9/1999 | Miller | |
| 5,959,945 A * | 9/1999 | Kleiman | 381/81 |
| 5,966,495 A | 10/1999 | Takahashi | |
| 5,978,855 A | 11/1999 | Metz | |
| 5,980,261 A * | 11/1999 | Mino et al. | 434/307 A |
| 5,999,624 A * | 12/1999 | Hopkins | 380/24 |
| 6,002,720 A | 12/1999 | Yurt | |
| 6,008,735 A * | 12/1999 | Chiloyan et al. | 340/825.22 |
| 6,009,274 A | 12/1999 | Fletcher | |
| 6,018,337 A | 1/2000 | Peters | |
| 6,018,726 A | 1/2000 | Tsumura | |
| 6,040,829 A * | 3/2000 | Croy et al. | 715/864 |
| 6,057,874 A * | 5/2000 | Michaud | 725/141 |
| 6,069,672 A * | 5/2000 | Claassen | 348/734 |
| 6,072,982 A | 6/2000 | Haddad | |
| 6,107,937 A * | 8/2000 | Hamada | 340/825.69 |
| 6,124,804 A * | 9/2000 | Kitao et al. | 340/825.69 |
| 6,151,077 A * | 11/2000 | Vogel et al. | 348/553 |
| 6,151,634 A | 11/2000 | Glaser | |
| 6,170,060 B1 * | 1/2001 | Mott et al. | 713/201 |
| 6,173,172 B1 | 1/2001 | Masuda et al. | 455/410 |
| 6,175,861 B1 * | 1/2001 | Williams, Jr. et al. | 709/217 |
| 6,182,126 B1 * | 1/2001 | Nathan et al. | 709/219 |
| 6,198,408 B1 * | 3/2001 | Cohen | 340/825.69 |
| 6,243,725 B1 * | 6/2001 | Hempleman et al. | 715/530 |
| 6,308,204 B1 * | 10/2001 | Nathan et al. | 709/221 |
| 6,323,911 B1 | 11/2001 | Schein et al. | 348/552 |
| 6,346,951 B1 * | 2/2002 | Mastronardi | 715/716 |
| 6,359,661 B1 * | 3/2002 | Nickum | 348/734 |
| 6,384,737 B1 * | 5/2002 | Hsu et al. | 340/825.69 |
| 6,396,480 B1 * | 5/2002 | Schindler et al. | 345/169 |
| 6,408,435 B1 * | 6/2002 | Sato | 725/58 |
| 6,421,651 B1 * | 7/2002 | Tedesco et al. | 705/8 |
| 6,438,450 B1 * | 8/2002 | DiLorenzo | 700/236 |
| 6,538,558 B2 * | 3/2003 | Sakazume et al. | 340/5.23 |
| 6,543,052 B1 * | 4/2003 | Ogasawara | 725/60 |
| 6,549,719 B2 * | 4/2003 | Mankovitz | 386/83 |
| 6,570,507 B1 * | 5/2003 | Lee et al. | 340/825.22 |
| 6,587,403 B1 * | 7/2003 | Keller et al. | 369/30.06 |
| 6,622,307 B1 * | 9/2003 | Ho | 725/120 |
| 2003/0031096 A1 * | 2/2003 | Nathan et al. | 369/30.03 |

FOREIGN PATENT DOCUMENTS

| | | | |
|---|---|---|---|
| FR | A 2602352 | 2/1988 | |
| GB | A 2122799 | 1/1984 | |
| GB | 2166328 A | 4/1986 | |
| GB | 2170943 | 8/1986 | |
| GB | 2193420 | * 2/1988 | |
| GB | 2 238680 A | 6/1991 | |
| GB | 2259398 | 3/1993 | |
| GB | 2262170 A | 6/1993 | |
| JP | 57-173207 | 10/1982 | |
| JP | 60-253082 | 12/1985 | |
| JP | 62-192849 | 8/1987 | |
| JP | 07281682 | 10/1995 | |
| JP | 08-279235 | 10/1996 | |
| JP | 10-098344 | 4/1998 | |
| WO | WO86 01326 A | 2/1986 | |
| WO | WO91/08542 | 6/1991 | |
| WO | WO91/20082 | * 12/1991 | |
| WO | WO A 91 20082 | 12/1991 | |
| WO | WO93/16557 | 8/1993 | |
| WO | WO A 93 18465 | 9/1993 | |
| WO | WO A 94 03894 | 2/1994 | |
| WO | WO94/14273 | 6/1994 | |
| WO | WO94 15416 A | 7/1994 | |
| WO | WO95 03609 A | 2/1995 | |
| WO | WO95/29537 | 11/1995 | |
| WO | WO96 12257 A | 4/1996 | |
| WO | WO96/12258 | * 4/1996 | |
| WO | WO98 07940 A | 2/1998 | |
| WO | WO98/45835 | 10/1998 | |
| WO | WO 01/00290 | 1/2001 | |

* cited by examiner

REMOTE CONTROL UNIT FOR INTELLIGENT DIGITAL AUDIOVISUAL REPRODUCTION SYSTEMS

FIELD OF THE INVENTION

The present invention relates to a remote control unit for intelligent digital audiovisual reproduction systems, also called jukeboxes.

BACKGROUND OF THE INVENTION

Remote control systems are known in the prior art that use infrared technology to control a device. These systems comprise a transmitter located on the remote control unit and a receiver located on the device. The use of infrared rays requires the transmitter to be pointed towards the receiver on the device.

OBJECT AND SUMMARY OF THE INVENTION

The object of the present invention is to overcome the drawbacks of the prior art by offering a remote control unit that is user-friendly and secure.

This object is achieved by the fact that the remote control unit for intelligent digital audiovisual reproduction systems, comprising storage means, payment means, a sound control circuit and display means, wherein the remote control unit comprises a radio frequency transmitter that is associated with a radio frequency receiver connected to the sound control circuit of the audiovisual reproduction system.

According to another characteristic, the remote control unit has a code that is stored by a learning procedure by the audiovisual reproduction system.

According to another characteristic, at least one audiovisual reproduction system receives a remote control code from the central server that is connected to the reproduction system.

According to another characteristic, a function of the remote control is to disactivate or activate the audiovisual reproduction system and the means of payment.

According to another characteristic, disactivating the means of payment triggers an operator-programmed message to be displayed on the audiovisual reproduction system display means.

According to another characteristic, a function of the remote control enables the audiovisual reproduction system to be credited with a credit equivalent to the selection of at least one song; the maximum number of credits being stored on storage means of the reproduction system.

A second object of the invention is to offer a learning procedure of the code of the remote control unit of the invention using an audiovisual reproduction system.

This object is achieved due to the fact that the learning procedure comprises the following steps:
 a step in which the audiovisual reproduction system is set to the learning mode,
 a step of using the remote control unit close to the audiovisual reproduction system, in this operating mode the audiovisual reproduction system waits for at least one remote control identification code,
 a step of storing the remote control identification code on the storage means of the reproduction system.

According to another characteristic, the learning mode is included in the operating system of the audiovisual reproduction system.

According to another characteristic, use of the remote control unit causes it to transmit a signal containing an identification code that is contained in the remote control memory.

According to another characteristic, the step of storing comprises the recognition of an identification code in a signal transmitted by the remote control unit.

Other advantages and advantages of the present invention will be better understood from the following detailed description referring to the attached drawing.

FIG. 1 shows a block diagram of an intelligent digital audiovisual reproduction system of the prior art.

DESCRIPTION OF THE PREFERRED EMBODIMENTS

The sole FIGURE shows the audiovisual reproduction system described in international patent application WO 96/12257. Preferably, but in a non-limitative way, this audiovisual reproduction system uses the equipment parts that are number and referred to below.

The central processing unit (1) is a system that is compatible with a high-performance PC. An intel pentium-type system that has storage means and the following minimum characteristics should be used to implement the invention:
 compatibility with the local Vesa bus,
 processor cache buffer: 256 Kbytes,
 RAM: 32 Mbytes,
 high-performance serial and parallel ports,
 SVGA or similar microprocessor graphic adapter,
 SCSI/2 or similar bus controller
 self-powered static RAM.

Any similar CPU with equivalent or better performance characteristics may be used in the invention.

This CPU controls and manages a sound control circuit (5), a telecommunications control circuit (4), an input control circuit (3), a mass storage control circuit (2) and a display means control circuit (6). The display means are mainly composed of a high definition, low radiation, non-interleafed SVGA-type flat screen video monitor (62). This monitor is used to reproduce images, for example the album covers of musical selections, graphics or video clips.

Storage modules (21) are also included as storage means using SCSI-type high-speed, high-capacity hard disks and are associated with the storage means already present in the CPU. These modules are used to store audiovisual information.

A high-speed (28.8 kbps) telecommunications modem (41) adapter is built in to allow connection with an audiovisual information distribution network controlled by a central server.

In order to reproduce the sound information of the musical selections the system comprises loud speakers (54) that receive the signal from a tuner-amplifier (53) connected to a music synthesizer-type electric circuit (5). Said electric circuit is built to accommodate a large number of input sources while having an outlet that provides CD (compact disc)-type quality, such as the sound-card type microprocessor multimedia audio adapter.

Using the input control circuit (3), the audiovisual reproduction system controls a touch screen (33) that includes a panel covering the glass and that uses "advanced surface wave technology" as well as an AT-type bus controller. This touch screen enables various selection information used by the customer to be displayed on the video monitor (62) or on a television screen (61). It also displays management control information used by the manager or the owner of the system.

It is also used for maintenance repairs in combination with an external keyboard (34) that can be connected to a system with a suitable keyboard connector controlled by a keyed lock (32) via the interface circuit (3).

The interface circuit input (3) also controls a remote control assembly (31).

An audiovisual payment device (35) is also connected to the interface surface input (3). It is also possible to use any other device to receive any method of payment by coins, notes, tokens, chip cards or combinations of methods of payment.

The system is housed in the steel chassis or frame.

In addition to these parts, a cordless microphone (55) is connected to the sound controller (5), which transforms said audiovisual reproduction system into a powerful announcement and information system intended for the public or possibly for a karaoke machine. Similarly, the system can use a cordless loud speaker system.

The remote controlled assembly (31) enables the manager, for example from behind the bar, to access and operate various controls, such as:
  the microphone on/off control,
  the loud speaker muting control,
  the volume control
  the control for canceling music currently being played.

The operating system has been designed around a library of tools and services that are particularly directed toward the audiovisual field in a multimedia environment. Advantageously, this library includes a high performance multi-task operating system that effectively authorizes the simultaneous implementation of multiple code fragments. Therefore, this operating system is used, in an organized way that avoids any conflict, for rival implementations, operations implemented on display means, sound reproduction means and for controlling telecommunication connections through a distribution network. Furthermore, this operating system is extremely flexible.

The compressed and digitized audiovisual data is stored in storage means (21).

The library of tools and services comprises a first module, referred to as SSM, that is a start-up module for the system. This module only provides a single service, consequently it is automatically charged when the system is powered-up. The system goes directly into the "in service" mode of the module referred to as RMM if the system is started up using a correct recorded number.

The RMM module is the "in service" mode module, i.e. the operating mode which the system enters as soon as the recorded number has been validated. In this mode the system is ready to implement any requests that can be triggered by any of a number of predefined operations, such as:
  customers touching the screen: when a customer or user touches the screen, the system transfers control of the foreground session to the CBSM module that controls the customer selection and exploration mode,
  the telecommunications network call request server: when the system detects a loop on the telephone line it transmits a background asynchronous procedure: the TSM module telecom service mode,
  receiving a remote control signal: when an order is received it is processed in a background session by the SMM system control module. However, the foreground session remains available for other operations.

The system remains in the "in service" mode until one of the above-mentioned operations is implemented.

The SMM module is the system control module. The module is used to implement operations that order the system to accept an input requested by a remote control device, these operations being immediately processed without canceling the procedure currently being carried out. A very large number of such operations are possible, of which only a few, non-limitative operations are listed below:
  volume adjustment of the selections played,
  volume adjustment of the auxiliary source played,
  microphone on/off control
  adjustment of the microphone volume,
  balance adjustment of left and right channels
  control of the bass frequency level,
  control of the treble frequency level,
  control for canceling or skipping a musical selection track,
  control for panoramic, zoom in and zoom out effects,
  triggering of software program reset.

The TSM module is the telecommunications service mode module between the central server and the audiovisual reproduction system. This module is used to control all the control services available on the distribution network. All the telecommunication tasks are controlled as background tasks of the system. These tasks only ever use the processing time that remains once the system has completed all the foreground tasks. Therefore, when the system is busy with a high-priority task, the telecommunication tasks automatically reduce the demands on the resources of the system and use any processing time the microprocessor leaves available.

The remote control unit according to the invention constitutes the remote control assembly of the audiovisual reproduction system. The remote control unit according to the invention is a remote control unit that uses a radio frequency transmitter. The reproduction system comprises a radio frequency receiver that is advantageously located on the sound control circuit (5). Advantageously, the remote control unit comprises fastening means that connect it to a component, for example the bar, which is not necessarily directed towards the reproduction system. The use of radio frequencies does not require the transmitter to be directed towards the receiver. Therefore, this characteristic avoids any deterioration due to the operations involved in directing the remote control unit toward the audiovisual reproduction system.

The remote control unit has a code in order for an audiovisual system to be customized to a particular remote control. This code is in the form of an address constituted by a DIP switch. When the remote control unit is used the signal it transmits comprises a first data item that contains the code and a second data item that contains the code of the key that has been used. The remote control identification code is stored by the audiovisual reproduction system when the remote control unit is first used, according to a special learning procedure. The procedure comprises several steps.
  In a first step the audiovisual reproduction system is set to the learning mode. This learning mode consists in implementing a sub routine of the library of tools and services of the operating system of the reproduction system. This procedure is triggered by lightly touching a special button that is displayed on the screen by the display means. When the operating system is in this mode it is ready to receive a remote control code to allow the reproduction system to only react when the remote control is actuated, following certain operations. Advantageously, the remote control unit comprises a specific key that triggers a signal being transmitted, said signal comprising the code stored in the memory.
  In a step of using, the remote control unit transmits the identification code in the signal when it is used.
  In a step of storing, the audiovisual reproduction system stores the remote control identification code in its storage means. The learning mode of the reproduction system enables it to recognize and to store the code in the signal transmitted by the remote control unit. At the end of this step the reproduction system returns to the "in service" mode. Therefore, this special learning mode eliminates the need to preprogram the remote control code in the audiovisual reproduction system. Furthermore, once the remote control code has been stored by a reproduction system, every subsequent time the remote control is used, the operating system verifies the identification code of the remote control unit that has just transmitted a signal containing the stored code. If the two codes are identical the function that corresponds to the code of the pressed key will be implemented. If the two codes are not identical there will be no response.

Advantageously, the remote control code is stored in an integrated circuit (I button) that is only powered when an operation is implemented and that is capable of storing serial information in a nonvolatile memory.

Advantageously, a second code of a second remote control unit is stored by one audiovisual reproduction system. This second code can be transmitted to each audiovisual reproduction system using the central server and the distribution network to which the audiovisual reproduction system is connected via the telecommunication modem (41).

The remote control unit according to the invention enables certain actions to be implemented on the audiovisual reproduction system using particular keys and functions controlled by the SMM module. A first function, that is effected using a remote control key, is to disactivate the reproduction system and the payment means. Dis-activating the reproduction system prevents any payment means, such as tokens, coins, notes, chip cards etc. from being inserted. Advantageously, the audiovisual reproduction system display screen displays a message while the system is disactivated, for example to inform the user that the audiovisual reproduction system is not available. Advantageously, the message can be operator-programmed by the hirer of the audiovisual reproduction system. The reproduction system and the payment means are also brought back into service using either the same key or a different key on the remote control unit.

A second function of the remote control unit is to be able credit the audiovisual reproduction system with a value equivalent to at least one song. The number of songs is updated each time the second function is used and each time an operator modifies the value of said number. This second function enables, for example, the manager of a bar in which the audiovisual reproduction system is installed to provide his customers with at least one selection without him having to go to the reproduction system and without having to carry out complicated operations.

The remote control unit according to the invention may be seen to be more user-friendly as it is not necessary for it to be pointed towards the audiovisual reproduction system. Furthermore, it is possible for it to be fastened, for example to the bar, thereby avoiding the remote control unit becoming lost or broken. The code learning mode avoids a remote control unit having to be associated with a reproduction system during manufacture in a plant. This simplifies stock management. The additional remote control unit functions also simplify use of the audiovisual reproduction system.

Other modifications available to those skilled in the art can clearly be included in the invention.

The invention claimed is:

1. A jukebox system, comprising:
    a plurality of jukebox devices, wherein each jukebox device includes a microprocessor, a storage device for storing audiovisual information that can be reproduced by the jukebox device in response to user requests, an audio system for playing audio, a display device for displaying video, and a communication system for enabling the jukebox to communicate through an audiovisual distribution network;
    a server remote to said jukebox devices that provides services to said jukebox devices, wherein said server and each of said jukebox devices can communicate with each other through said distribution network; and
    a plurality of remote control devices for said jukebox devices, wherein each of said remote control devices comprises:
        a remote transmitter that is associated with a receiver connected to a control circuit of one of said jukebox devices, wherein each remote control device is operable to control one of said jukebox devices only when said jukebox device recognizes a control signal comprising a remote control identification code identifying the remote control device, stored on the remote control device and transmitted from the remote control device, wherein the control signal further comprises a key code sent to control a selected feature of the jukebox; and
        a specific key that, when actuated, triggers a signal comprising a remote control identification code without an associated key code which facilitates the storing of this remote control identification code as a saved remote control identification code by the jukebox, each remote control device operable to transmit a plurality of key codes for controlling a plurality of functions of a jukebox device;
    wherein at least one jukebox of said plurality of jukebox devices further comprises:
        remote control code storage that stores a saved remote control identification code sent by an associated remote control device;
        server code storage that stores a server identification code sent by the server connected to said plurality of jukebox devices, said server identification code identifying another remote control device; and
        a storage location that stores the transmitted remote control identification code for use in comparing the saved remote control identification code and/or the server identification code with the transmitted remote control identification code stored on the jukebox to determine whether or not the jukebox will respond to control signals from the remote control transmitting the remote control identification code.

2. The jukebox system of claim 1, wherein each of said jukebox devices include a learning mode that enables the remote control identification code to be obtained from the remote control when the specific key is actuated and to be stored on the jukebox as the saved remote control identification code.

3. The jukebox system of claim 2, wherein the learning mode is incorporated into an operating system of the jukebox device, this learning mode being triggered by touching a special button displayed on the display device of the jukebox device.

4. The jukebox system of claim 1, wherein the remote control is operable to activate and deactivate the associated jukebox device.

5. The jukebox system of claim 1, wherein the remote control is operable to activate and deactivate a payment device on the associated jukebox device.

* * * * *